US010225978B1

(12) United States Patent
Schoeny et al.

(10) Patent No.: US 10,225,978 B1
(45) Date of Patent: Mar. 12, 2019

(54) SYSTEM AND METHOD FOR SWITCHING BETWEEN SEED TYPES DURING A MULTI-VARIETY SEED PLANTING OPERATION

(71) Applicant: CNH Industrial America, LLC, New Holland, PA (US)

(72) Inventors: Christopher Schoeny, Yorkville, IL (US); Chad M. Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/704,472

(22) Filed: Sep. 14, 2017

(51) Int. Cl.
| | | |
|---|---|---|
| *A01C 21/00* | (2006.01) |
| *A01C 7/10* | (2006.01) |
| *A01C 7/04* | (2006.01) |
| *A01C 5/06* | (2006.01) |
| *A01C 15/00* | (2006.01) |
| *A01C 7/20* | (2006.01) |

(52) U.S. Cl.
CPC ............ *A01C 21/005* (2013.01); *A01C 7/044* (2013.01); *A01C 7/105* (2013.01); *A01C 5/064* (2013.01); *A01C 5/068* (2013.01); *A01C 7/206* (2013.01); *A01C 15/006* (2013.01)

(58) Field of Classification Search
CPC ....... A01C 21/005; A01C 7/044; A01C 7/105; A01C 5/064; A01C 5/068; A01C 7/206; A01C 15/006
See application file for complete search history.

(56) References Cited

U.S. PATENT DOCUMENTS

| | | |
|---|---|---|
| 5,963,139 A | 10/1999 | Littke |
| 7,478,603 B2 | 1/2009 | Riewerts et al. |
| 7,725,251 B2 | 5/2010 | Steimel |
| 7,938,075 B1 | 5/2011 | Glendenning et al. |
| 8,925,471 B2 | 1/2015 | Adams et al. |
| 8,942,896 B2 | 1/2015 | Mayerle |
| 9,179,594 B2 | 11/2015 | Graham |
| 9,237,687 B2 | 1/2016 | Sauder et al. |
| 9,360,121 B2 | 6/2016 | Garner et al. |

(Continued)

FOREIGN PATENT DOCUMENTS

WO    WO 2017/011355    1/2017

OTHER PUBLICATIONS

Malhotra et al., Blockage detection in seeder, 2016, IEEE, p. 1-4 (Year: 2016).*

(Continued)

*Primary Examiner* — McDieunel Marc
(74) *Attorney, Agent, or Firm* — Rebecca L. Henkel; Richard K. DeMille

(57) ABSTRACT

When performing a seed planting operation, a variety change distance may be calculated that corresponds to the distance from a variety zone boundary of a prescription map that a row unit of a planter must be located prior to initiating a variety change procedure for switching seed types. Once the row unit reaches a variety change boundary spaced apart from the variety zone boundary by the calculated variety change distance, a system controller may initiate the variety change procedure to allow the seed type being planted to be efficiently and effectively switched as the planter makes a planting pass across the field.

18 Claims, 10 Drawing Sheets

(56) References Cited

U.S. PATENT DOCUMENTS

| | | | |
|---|---|---|---|
| 9,481,294 B2 | 11/2016 | Sauder et al. | |
| 9,585,303 B2 | 3/2017 | Rylander | |
| 9,596,803 B2 | 3/2017 | Wendte et al. | |
| 9,603,298 B2 * | 3/2017 | Wendte | A01C 7/04 |
| 9,603,299 B2 * | 3/2017 | Wendte | A01C 7/04 |
| 9,622,402 B2 | 4/2017 | Kinzenbaw et al. | |
| 9,706,705 B2 * | 7/2017 | Czapka | A01C 21/005 |
| 9,941,901 B2 | 4/2018 | Chen et al. | |
| 2014/0165889 A1 * | 6/2014 | Garner | A01C 7/10 111/130 |
| 2014/0165891 A1 * | 6/2014 | Garner | A01C 7/08 111/170 |
| 2014/0277959 A1 | 9/2014 | Wagers et al. | |
| 2015/0156964 A1 | 6/2015 | Krohn et al. | |
| 2015/0195988 A1 | 7/2015 | Radtke et al. | |
| 2015/0216107 A1 | 8/2015 | Wendte et al. | |
| 2015/0223390 A1 * | 8/2015 | Wendte | A01C 7/04 111/177 |
| 2015/0223391 A1 * | 8/2015 | Wendte | A01C 7/04 111/177 |
| 2015/0351314 A1 | 12/2015 | Sauder et al. | |
| 2016/0037713 A1 | 2/2016 | Wendte et al. | |
| 2016/0143212 A1 | 5/2016 | Wendte et al. | |
| 2016/0165794 A1 * | 6/2016 | Czapka | A01C 21/005 111/185 |
| 2016/0234996 A1 | 8/2016 | Sauder et al. | |
| 2016/0249525 A1 | 9/2016 | Baurer et al. | |
| 2016/0255766 A1 | 9/2016 | Assy et al. | |
| 2016/0302353 A1 | 10/2016 | Wendte et al. | |
| 2018/0259979 A1 * | 9/2018 | Schoeny | G05D 9/12 |

OTHER PUBLICATIONS

Dionido et al., Autonomous seed-planting vehicle, 2017, IEEE, p. 1212-126 (Year: 2017).*

Chitra et al., A contraption endorsed Indian pulse seed recognition system with quality determination prioritizing compound imaging techniques, 2017, IEEE, p. 1-27 (Year: 2017).*

Mandal et al., Forward and reverse mapping of extreme learning machine model of a precision planter, 2015, IEEE, p. 1-6 (Year: 2015).*

John Deere/US "Spacing nod Singulation" www.deere.com Dated Feb. 9, 201 7 (3 pages).

Case 1H "Precision Disk™ 500T Air Drill" www.caseih.com Dated Feb. 9, 2017 (23 pages).

Kinze 4900 Multi-Hybrid Planter Dated Apr. 28, 2014 (5 pages) http://www.kinze.com/planter.aspx?id=4936fa23.aef1-423b-98dc.e612ffcc17at&name=4900+multi-hybrid+planter.

Eset Space Precisely Harvest More Dated Apr. 28, 2017 (4 pages) http://www.precisionplanting.com/#products/eset/.

* cited by examiner

SYSTEM AND METHOD FOR SWITCHING BETWEEN SEED TYPES DURING A MULTI-VARIETY SEED PLANTING OPERATION

FIELD OF THE INVENTION

The present subject matter relates generally to row-crop planters or seeders and, more particularly, to a system and method for switching between seed types when performing a multi-variety seed planting operation.

BACKGROUND OF THE INVENTION

Modern farming practices strive to increase yields of agricultural fields. Technological advances in the area of planting implements or planters allow for better agronomic characteristics at the time of planting, such as providing more accurate seed depth, improved uniformity of seed depth across the planter, and improved accuracy of in-row seed spacing. However, a single field can have performance inconsistencies between different areas of the field. That is because a field can have a wide variety of soil types and management zones, such as irrigated and non-irrigated zones in different areas. To address this issue, seed companies have developed multiple varieties of each of their seed product types, with the different varieties offering improved performance characteristics for different types of soil and management practices.

In this regard, efforts have been made to plant multiple varieties of a particular seed product type in different areas of fields with different soil types or management zones. For example, planters have been developed that include separate bulk fill hoppers for different seed varieties and that require the reservoir for each seed meter be completely cleaned out or planted out before a different seed variety can be delivered to the seed meters. However, it is often quite difficult to determine when a given seed meter has been completely emptied of seeds to allow a new seed type to be delivered to the meter. As a result, current planting systems are typically ill-equipped to effectively and efficiently automatically switch between seed types during the performance of a planting operation.

Accordingly, an improved system and method that allows for more efficient and accurate switching between seed varieties or types when performing a planting operation would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for switching seed types between a first seed type and a second seed type during a planting operation. The method may include monitoring a location of a row unit of a planting implement within a field as the planting implement makes a planting pass across the field while seeds of the first seed type are being discharged from a seed meter of the row unit. The method may also include determining that the row unit will encounter a variety zone boundary along the planting pass, wherein the variety zone boundary identifies a location within the field at which it is prescribed to switch from planting seeds of the first seed type to planting seeds of the second seed type. Additionally, the method may include accessing a transition split percentage associated with a transition distance to be traversed by the row unit relative to the variety zone boundary across which seeds of both the first and second seed types will be planted and determining a variety change distance relative to the variety zone boundary based at least in part on the transition split percentage and a starvation distance associated with substantially evacuating the seed meter of the seeds of the first seed type. Further, the method may include terminating a supply of seeds of the first seed type to the seed meter when the row unit is located a distance from the variety zone boundary corresponding to the variety change distance and initiating a supply of seeds of the second seed type to the seed meter once the row unit has traveled the starvation distance across the field upon terminating the supply of the seeds of the first seed type to the seed meter.

In another aspect, the present subject matter is directed to a system for switching seed types between a first seed type and a second seed type when performing a planting operation with a row unit of a planting implement. The system may include a seed meter, a seed supply device configured to regulate a supply of seeds of the first seed type and the second seed type to the seed meter, and a controller communicatively coupled to the seed supply device. The controller may include a processor and associated memory. The memory may store instructions that, when implemented by the processor, configure the controller to monitor a location of the row unit within a field as the planting implement makes a planting pass across the field while seeds of the first seed type are being discharged from the seed meter. The controller may also be configured to determine that the row unit will encounter a variety zone boundary along the planting pass, wherein the variety zone boundary identifies a location within the field at which it is prescribed to switch from planting seeds of the first seed type to planting seeds of the second seed type. Additionally, the controller may be configured to access a transition split percentage associated with a transition distance to be traversed by the row unit relative to the variety zone boundary across which seeds of both the first and second seed types will be planted and determine a variety change distance relative to the variety zone boundary based at least in part on the transition split percentage and a starvation distance associated with substantially evacuating the seed meter of seeds of the first seed type. Moreover, the controller may be configured to control the operation of the seed supply device to terminate the supply of seeds of the first seed type to the seed meter when the row unit is located a distance from the variety zone boundary corresponding to the variety change distance and control the operation of the seed supply device to initiate the supply of seeds of the second seed type to the seed meter once the row unit has traveled the starvation distance across the field upon terminating the supply of the seeds of the first seed type to the seed meter.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
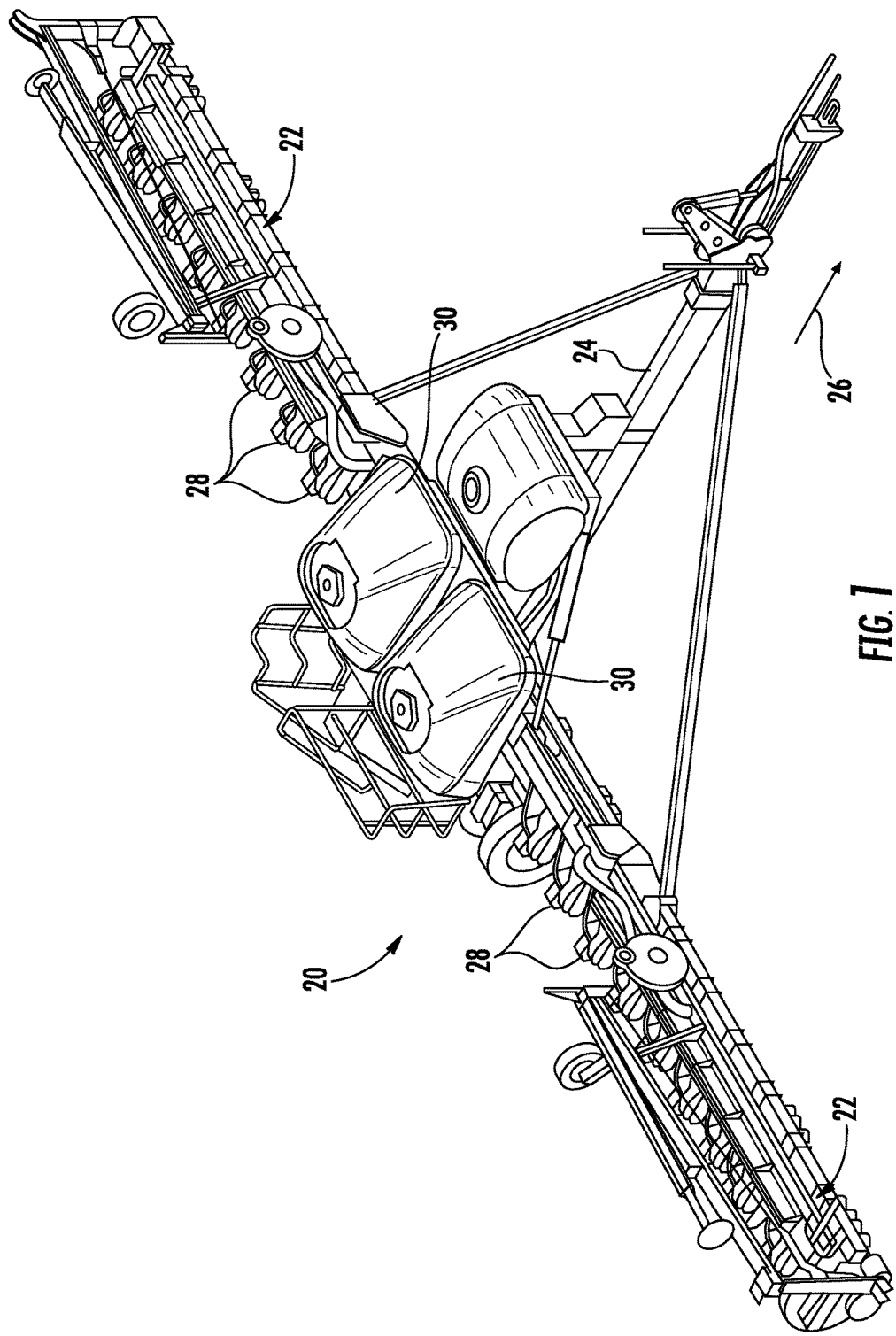
FIG. 1 illustrates a perspective view of one embodiment of a planter in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for switching between seed types when performing a seed planting operation. Specifically, in several embodiments, a variety change distance may be calculated that corresponds to the distance from a variety zone boundary of a prescription map that a row unit of a planter must be located prior to initiating a variety change procedure for switching seed types. Once the row unit reaches a variety change boundary spaced apart from the variety zone boundary by the calculated variety change distance, a controller of the system may initiate the variety change procedure to allow the seed type being planted to be efficiently and effectively switched as the row unit makes a planting pass across the field.

Referring now to drawings, FIG. 1 illustrates a perspective view of one embodiment of a planting implement or planter 20 in accordance with aspects of the present subject matter. As shown in FIG. 1, the planter 20 may include a laterally extending toolbar or frame assembly 22 connected at its middle to a forwardly extending tow bar 24 to allow the planter 20 to be towed by a work vehicle (not shown), such as an agricultural tractor, in a direction of travel (e.g., as indicated by arrow 26). The frame assembly 22 may generally be configured to support a plurality of seed planting units (or row units) 28. As is generally understood, each row unit 28 may be configured to deposit seeds at a desired depth beneath the soil surface and at a desired seed spacing as the planter 20 is being towed by the work vehicle, thereby establishing rows of planted seeds. In some embodiments, the bulk of the seeds to be planted may be stored in one or more seed tanks 30. Thus, as seeds are planted by the row units 28, a pneumatic distribution system may distribute additional seeds from the seed tanks 30 to the individual row units 28. Additionally, as will be described below, each row unit 28 may also include one or more individual seed hoppers for locally storing seeds at the row unit 28.

It should be appreciated that, for purposes of illustration, only a portion of the row units 28 of the planter 20 have been shown in FIG. 1. In general, the planter 20 may include any number of row units 28, such as 6, 8, 12, 16, 24, 32, or 36 row units. In addition, it should be appreciated that the lateral spacing between row units 28 may be selected based on the type of crop being planted. For example, the row units 28 may be spaced approximately 30 inches from one another for planting corn, and approximately 15 inches from one another for planting soybeans.

It should also be appreciated that the configuration of the planter 20 described above and shown in FIG. 1 is provided only to place the present subject matter in an exemplary field of use. Thus, it should be appreciated that the present subject matter may be readily adaptable to any manner of planter configuration.

Figure 2:
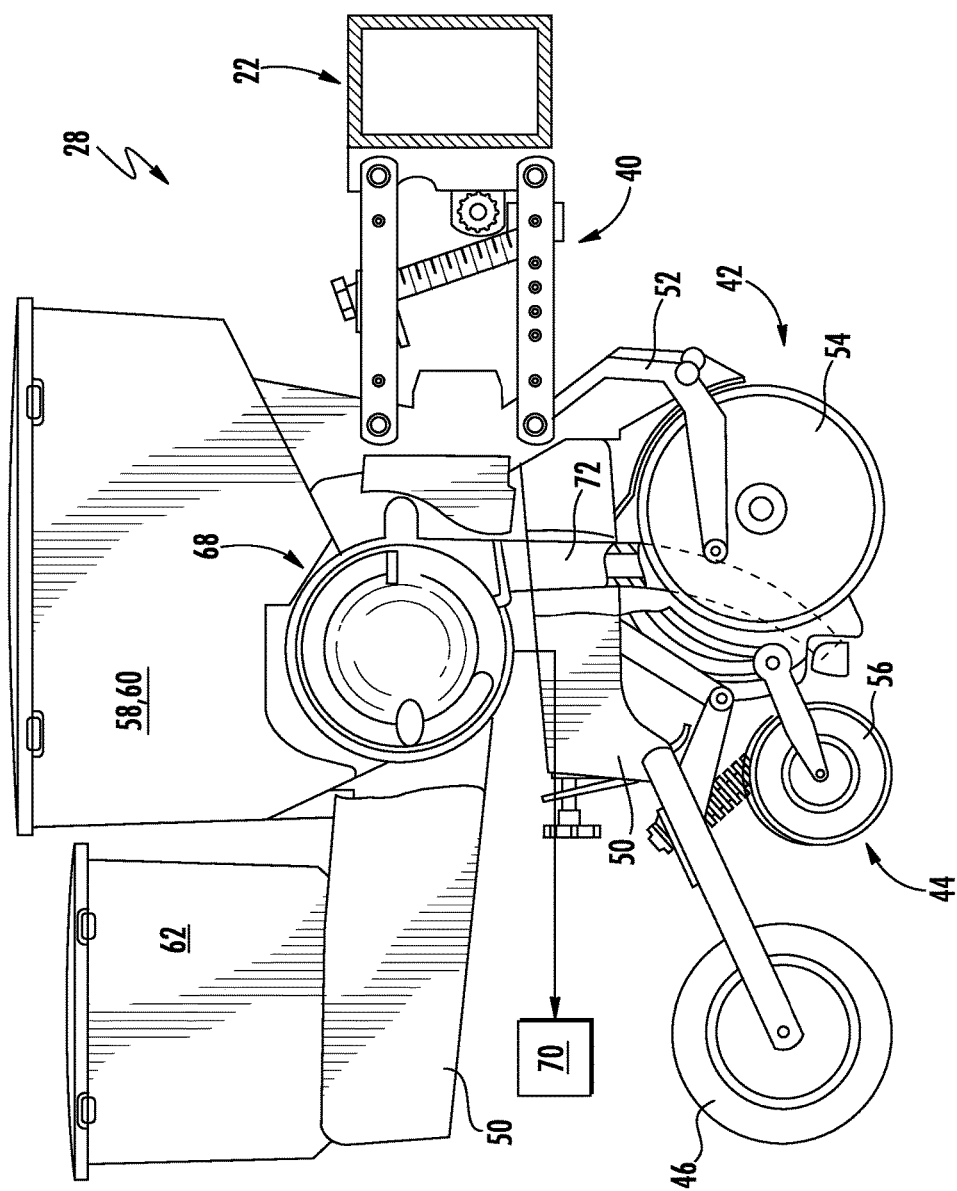
FIG. 2 illustrates a side view of one embodiment of a row unit suitable for use with a planter in accordance with aspects of the present subject matter.

Referring now to FIG. 2, a side view of one embodiment of a row unit 28 is illustrated in accordance with aspects of the present subject matter. As shown, the row unit 28 includes a linkage assembly 40 configured to mount the row unit 28 to the toolbar or frame assembly 22 of the planter 20. As shown in FIG. 2, the row unit 28 also includes a furrow opening assembly 42, a furrow closing assembly 44, and a press wheel 46. In general, the furrow opening assembly 42 may include a gauge wheel (not shown) operatively connected to a frame 50 of the row unit 28 via a support arm 52. Additionally, the opening assembly 42 may also include one or more opening disks 54 configured to excavate a furrow, or trench, in the soil. As is generally understood, the gauge wheel may be configured to engage the surface of the field, with the height of the opening disk(s) 54 being adjusted with respect to the position of the gauge wheel to set the desired depth of the furrow being excavated. Moreover, as shown, the furrow closing assembly 44 may include a closing disk(s) 56 configured to close the furrow after seeds have been deposited into the furrow. The press wheel 46 may then be configured to roll over the closed furrow to firm the soil over the seed and promote favorable seed-to-soil contact.

Additionally, as shown in FIG. 2, the row unit 28 may include one or more seed hoppers 58, 60 and, optionally, a granular chemical product hopper 62 supported on the frame 50. In general, the seed hopper(s) 58, 60 may be configured to store seeds to be gravitationally deposited within the furrow as the row unit 28 moves over and across the field. For instance, in one embodiment, the row unit 28 may include a first seed hopper 58 configured to store seeds 64 (FIG. 3) of a first seed type and a second hopper 60 configured to store seeds 66 (FIG. 3) of a second seed type. In another embodiment, the row unit 28 may include more than two seed hoppers, with each seed hopper storing a different seed type. Alternatively, a single seed hopper may be used to store more than one type of seed. For example, a single seed hopper may be internally divided (e.g., via a divider wall(s)) so as to define separate seed chambers or compartments for storing differing seed types.

Moreover, the row unit 28 may include a seed meter 68 provided in operative association with the seed hopper(s) 58, 60. In general, the seed meter 68 may be configured to uniformly release seeds received from the seed hopper(s) 58, 60 for deposit within the furrow. For instance, the seed meter 68 may be coupled to a suitable vacuum source 70 (e.g., a blower powered by a motor and associated tubing or hoses) configured to generate a vacuum or negative pressure that attaches the seeds to a rotating seed disk (not shown) of the seed meter 68, which controls the rate at which the seeds are output from the seed meter 68 to an associated seed tube 72. As shown in FIG. 2, the seed tube 72 may extend vertically between the seed meter 68 and the ground to facilitate delivery of the seeds output from the seed meter 68 to the furrow.

It should be appreciated that the configuration of the row unit 28 described above and shown in FIG. 2 is provided only to place the present subject matter in an exemplary field of use. Thus, it should be appreciated that the present subject matter may be readily adaptable to any manner of row unit configuration.

Figure 3:
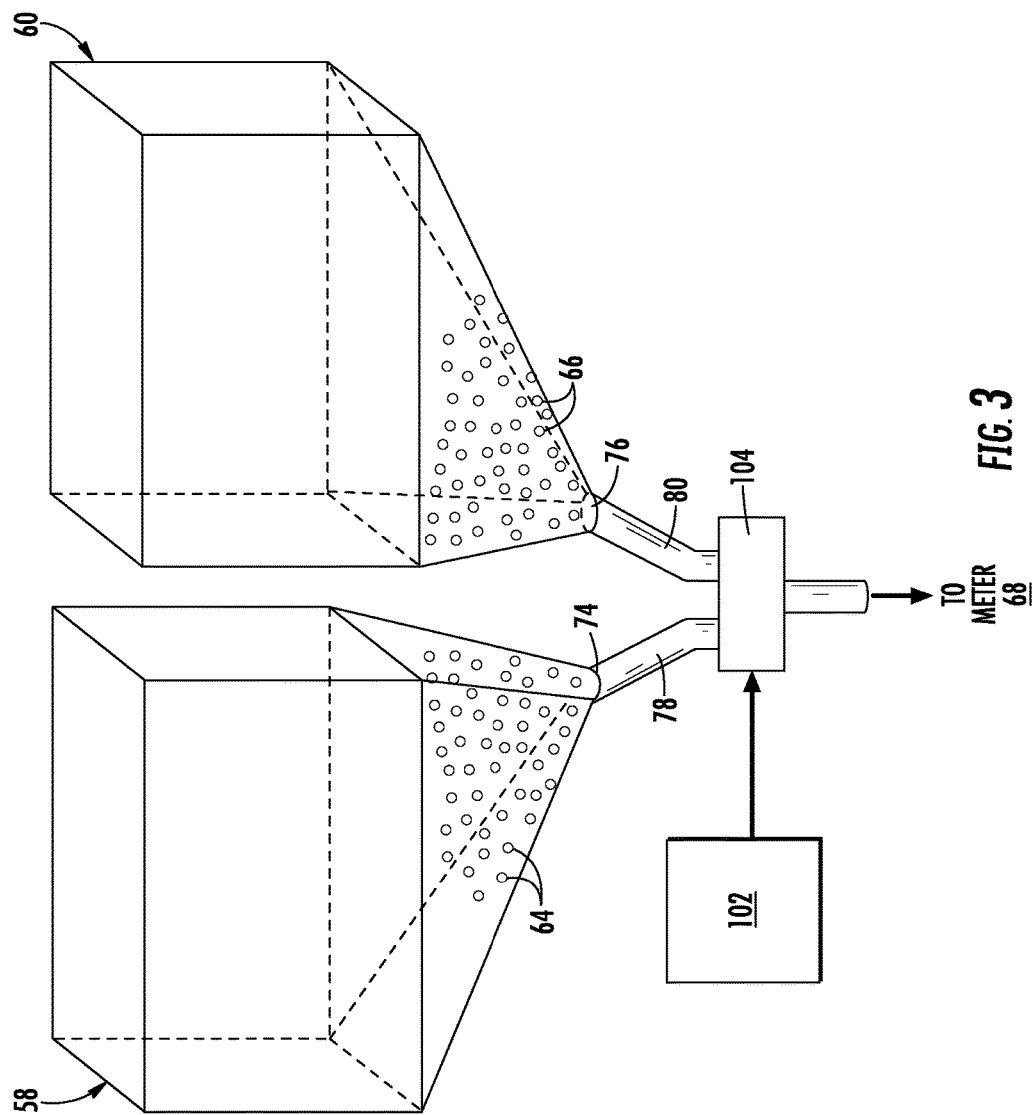
FIG. 3 illustrates a seed supply arrangement for supplying seeds of differing types to a seed meter in accordance with aspects of the present subject matter.

Referring now to FIG. 3, a schematic view of one embodiment of seed supply arrangement for supplying different types of seeds to the seed meter 68 of a row unit 28 is illustrated in accordance with aspects of the present subject matter. As shown, the first and second seed hoppers 58, 60 of the row unit 28 may each include a respective seed discharge outlet 74, 76, with each seed discharge outlet 74, 76 feeding into a respective input conduit 78, 80 in flow communication with a seed supply device 104. In general, the seed supply device 104 may correspond to any suitable device or mechanism (including any combination of devices or mechanisms) configured to regulate the supply of seeds 64, 66 from the first and second seed hoppers 58, 60 to the seed meter 68. For instance, as indicated above, seeds 64 of a first seed type may be stored within the first seed hopper 58 while seeds 66 of a second seed type may be stored within the second seed hopper 60. In such an embodiment, the seed supply device 104 may be configured to control the flow of seeds 64, 66 to the seed meter 68 based on the desired or selected seed type to be planted. For instance, when it is desired to supply seeds 64 of the first seed type to the seed meter 68, the seed supply device 104 may block the flow of seeds 66 through the input conduit 80 associated with the second seed hopper 60 while allowing seeds 64 from the first seed hopper 58 to flow through its associated input conduit 78 and be supplied to the seed meter 68. Similarly, when it is desired to supply seeds 66 of the second seed type to the seed meter 68, the seed supply device 104 may block the flow of seeds 64 through the input conduit 78 associated with the first seed hopper 58 while allowing seeds 66 from the second seed hopper 60 to flow through its associated input conduit 80 and be supplied to the seed meter 68.

It should be appreciated that, in one embodiment, the seed supply device 100 may correspond to one or more control valves configured to regulate the supply of seeds 64, 66 to the seed meter 68. For example, in one embodiment, a single control valve may be used that is configured to be selectively actuated between a first position in which seeds 64 of the first seed type are supplied from the first seed hopper 58 to the seed meter 68, a second position in which seeds 66 of the second type are supplied from the second seed hopper 60 to the seed meter 68, and a third position in which the control valve(s) stops the supply or flow of seeds 64, 66 from both of the seed hoppers 58, 60 to the seed meter 68. Alternatively, the seed supply device 104 may include two separate control valves (e.g., a first control valve provided in operative association with the input conduit 78 for the first seed hopper 58 and a second control valve provided in operative association with the input conduit 80 for the second seed hopper 60), with each valve configured to be actuated between opened and closed states for controlling the flow of seeds 64, 66 from its respective seed hopper 58, 60 to the seed meter 68.

Additionally, in particular embodiment, the seed supply device 104 may include actively controlled gates configured to be actuated between opened and closed positions to control the flow of seeds 64, 66 to the seed member 68. For example, a first seed gate may be provided in operative association with the input conduit 78 for the first seed hopper 58 for controlling the flow of seeds 64 of the first seed type to the seed meter 68. Similarly, a second seed gate may be provided in operative association with the input conduit 80 for the second seed hopper 60 for controlling the flow of seeds 66 of the second seed type to the seed meter 68.

Regardless of the specific configuration of the seed supply device 104, such device 104 may be configured to be actively controlled to allow instantaneous control of the flow of seeds 64, 66 to the seed meter 68. For instance, as schematically shown in FIG. 3 and as will be described below, the operation of the seed supply device 104 may be controlled via an electronic controller 102 communicatively coupled to the device 104. In such an embodiment, the controller 102 may be configured to transmit suitable control signals to the seed supply device 104 for controlling its operation, thereby allowing the controller 102 to actively control the supply of seeds 64, 66 to the seed mete 68. For instance, the controller 102 may control the operation of the seed supply device 104 to cut off the supply of seeds 64, 66 from one of the seed hoppers 58, 60 while allowing seeds 64, 66 from the other seed hopper 58, 60 to be conveyed to the seed meter 68. Similarly, the controller 102 may control the operation of the seed supply device 104 such that the supply of seeds 64, 66 from both seed hoppers 58, 60 is either cut-off or turned on.

It should be appreciated that, although the seeds 64, 66 contained within the seed hoppers 58, 60 will generally be described herein as corresponding to different seed "types," it should be appreciated that the description of the different types includes different varieties or hybrids. In other words, the different types of seeds may include not only different varieties of the same plant species, but also different seed products. In this regard, different seed products can include seeds of different species as well as coated and uncoated seeds, such as insecticide coated and non-insecticide coated seeds. The different seed products can also include refuge in a bag seed and non-refuge in a bag seed, plant-parasite resistant seed and non-plant-parasite resistant seed, such as cyst nematode resistant seeds and non-cyst nematode resistant seeds, seed tolerant to herbicide and seed not tolerant to herbicide, or other different products.

It should also be appreciated that the configuration of the seed supply arrangement described above and shown in FIG. 3 is provided only to place the present subject matter in an exemplary field of use. Thus, it should be appreciated that the present subject matter may be readily adaptable to any manner of seed supply arrangement for supplying seeds of differing types to the seed meter 68 of each row unit 28. For instance, as indicated above, in another embodiment, a single seed hopper may be provided at each row unit 28, with the seed hopper being divided into separate compartments or chambers for storing seeds of differing types. In such an embodiment, the seed supply device 104 may be configured to regulate the supply of seeds from each compartment or chamber of the single seed hopper to control which type of seed is delivered to the seed meter 68. Alternatively, in embodiments in which each row unit 28 is not configured to store different seed types locally via separate hoppers or a multi-chamber hopper, the seed supply device 104 may be configured to regulate the supply of seeds from the seed tanks 30 of the planter 20 to control which type of seed is delivered to the seed meter 68. For instance, when seeds of differing types are configured to be supplied from the seed tanks 30 via a pneumatic distribution system, the seed supply device 104 may be provided in operative association with the pneumatic distribution system to control which type of seed is being delivered to the seed meters 68 of the row units 28, either individually or collectively.

Figure 4:
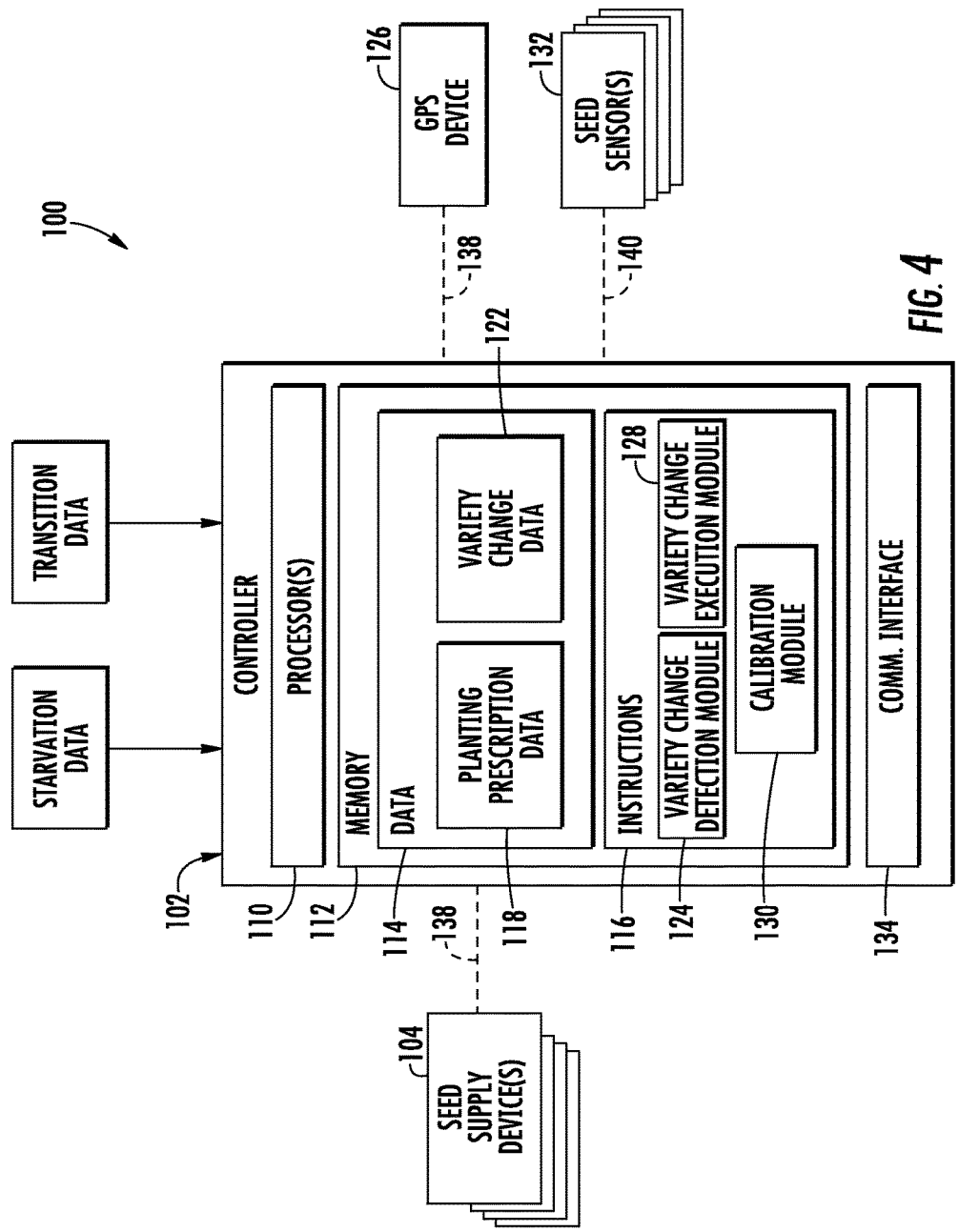
FIG. 4 illustrates a schematic view of one embodiment of a system for switching seed types between a first seed type and a second seed type when performing a planting operation with a row unit of a planting implement in accordance with aspects of the present subject matter.

Referring now to FIG. 4, a schematic view of one embodiment of a system 100 for switching between seed types during the performance of a seed planting operation is illustrated in accordance with aspects of the present subject matter. In general, the system 100 will be described herein with reference to the planting implement 20 and the row unit 28 described above with reference to FIGS. 1 and 2, as well as the seed supply arrangement shown in FIG. 3. However, it should be appreciated that the disclosed system 100 may generally be utilized with any planter or seeder having any suitable implement configuration and/or with row units having any suitable row unit configuration. Similarly, the disclosed system 100 may generally be utilized with any suitable seed supply arrangement for regulating the supply of seeds to the seed meter 68 of a row unit 28.

In several embodiments, the system 100 may include a controller 102 and various other components configured to be communicatively coupled to and/or controlled by the controller 102, such as one or more seed supply devices 104 (e.g., one seed supply device 104 per row unit 28). As will be described in greater detail below, the controller 102 may be configured to monitor the location of a row unit(s) 28 of the planter 20 within a field relative to an associated planting prescription map to determine whether the row unit(s) 28 will encounter a variety zone boundary (i.e., a boundary at which it is prescribed to switch the seed type being planted) along a given planting pass being made across the field. In the event that it is determined that a row unit(s) 28 will encounter a variety zone boundary, the controller 102 may be configured to calculate a variety change distance corresponding to a distance from the variety zone boundary at which the controller 102 will need to initiate a variety change procedure to allow the seed type currently being planted to be switched or changed. The controller 102 may then define a variety change boundary corresponding to a location in the field along the current planting pass that is spaced apart from the variety zone boundary by the calculated variety change distance. Once a given row unit(s) 28 has reached the variety change boundary, the controller 102 may control the operation of the seed supply device(s) 104 for that given row in order to implement the variety change procedure to switch the seed type currently being planted. For instance, when switching from a first seed type to a second seed type, the controller may be configured to control the seed supply device(s) of the associated row unit(s) 28 so as to initially cut-off or terminate the supply of seeds of the first seed type to the seed meter 68 when the variety change boundary is reached, thereby allowing the seeds of the first seed type to be substantially evacuated from the seed meter 68. Thereafter, the controller 102 may be configured to control the seed supply device(s) 104 to turn-on or initiate the supply of seeds of the second seed type to the meter 68, thereby allowing the seed type being planted to be switched.

In general, the controller 102 may correspond to any suitable processor-based device(s), such as a computing device or any combination of computing devices. Thus, as shown in FIG. 4, the controller 102 may generally include one or more processor(s) 110 and associated memory devices 112 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 112 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 112 may generally be configured to store information accessible to the processor(s) 110, including data 114 that can be retrieved, manipulated, created and/or stored by the processor(s) 110 and instructions 116 that can be executed by the processor(s) 110.

In several embodiments, the data 114 may be stored in one or more databases. For example, the memory 112 may include a planting prescription database 118 for storing data associated with one or more prescription maps for performing a seed planting operation within a field. As is generally understood, a planting prescription map may divide a field into two or more seed variety zones, with each seed variety zone specifying a specific seed type to be planted within the area of the field encompassed by such seed variety zone. In such instance, a variety zone boundary may be defined within the prescription map at the intersection of two adjacent seed variety zones. Depending on the planting prescription for the field, the variety zone boundary will often correspond to the location at which the seed type being planted is to be switched from a given seed type to a different seed type.

Figure 5:
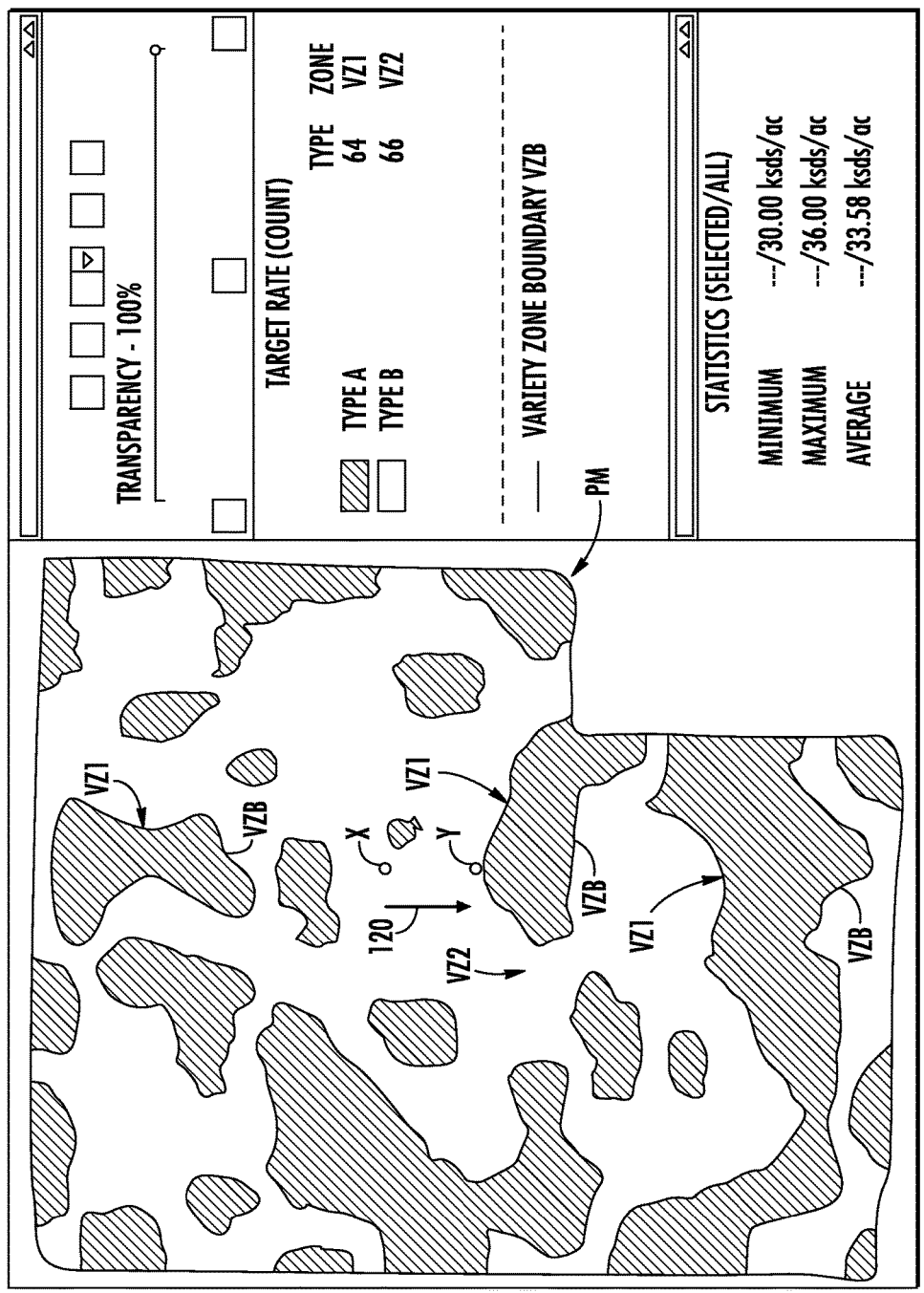
FIG. 5 illustrates an example view of one embodiment of a planting prescription map in accordance with aspects of the present subject matter.

For instance, an example planting prescription map (PM) is shown in FIG. 5. As shown, the prescription map PM identifies which type or variety zones VZ1, VZ2, are located where in the agricultural field and which types of seeds can be planted in the variety zones VZ1, VZ2. As shown in FIG. 5, in this embodiment, seeds of the first seed type (e.g., seeds 64 shown in FIG. 3) are shown as being acceptable for use in variety zone VZ1, corresponding to a recommended type A. Similarly, seeds of the second seed type (e.g., seeds 66 shown in FIG. 3) are shown as being acceptable for use in variety zone VZ2, corresponding to a recommended type B. Additionally, as shown in FIG. 5, a variety zone boundary (VZB) is defined at each intersection or interface defined between adjacent variety zones VZ1, VZ2. Thus, when transitioning from the first variety zone V1 to the second variety zone V2 or vice versa, the variety zone boundary VZB may generally define the location at which the seed type being planted is to be switched. For example, assuming a row unit(s) 28 of the planter 20 is located at position X within the field and is traveling in a travel direction indicated by arrow 120, the prescription map PM specifies that the row unit(s) 28 will need to switch from planting the second seed type to planting the first seed type as the row unit(s) 28 crosses the variety zone boundary VZB defined between the second variety zone VZ2 and the first variety zone VZ1 at location Y.

Referring back to FIG. 4, the memory 112 of the controller 102 may also include a variety change database 122 for storing data associated with one or more parameters that affect or impact switching between seed types during the performance of the planting operation. For example, in several embodiments, the variety change database 122 may include calibration data associated with an estimated number of seeds that should be remaining within the seed meter 68 upon cutting-off the supply a given seed type to the meter 68. Such data may be obtained, for instance, by conducting experiments in which the seed meter 68 is continuously supplied seeds of a given seed type for a period of time to allow the meter 68 to reach steady state operation. The supply of seeds to the seed meter 68 may then be cut-off and the number of seeds contained within the seed meter 68 (or subsequently discharged from the seed meter 68) counted to obtain a starvation seed count for the seed meter 68. This process may be repeated multiple times for each seed type to obtain an average starvation seed count for each individual seed type. As will be described below, this seed count data may be subsequently used by the controller 102 to determine a starvation distance across which a row unit(s) 28 will travel after terminating the supply of seed of a given seed type to the seed meter 68 prior to the seeds being substantially evacuated from the meter 68.

It should be appreciated that, in several embodiments, the starvation seed count stored within the variety change database 122 may be less than the actual, experimentally obtained seed count to provide a seed margin or buffer to prevent the seed meter 68 from being completely starved of seeds during the planting operation, which would lead to skips within the field. For instance, in one embodiment, the starvation seed count stored within the variety change database 122 may be at least 5% less than the experimentally obtained seed count, such as at least 10% less than the experimentally obtained seed count, or at least 15% less than the experimentally obtained seed count or at least 20% less than the experimentally obtained seed count. As a result, when performing the variety change procedure disclosed herein, the controller 102 may calculate a starvation distance that is less than the actual distance required to starve out the seed meter 68, thereby preventing seed skips within the field.

Additionally, in several embodiments, the variety change database 122 may include calibration data associated with one or more transition parameters for switching between seed types during the planting operation. Specifically, as indicated above, given that a seed margin or buffer is utilized for the seed starvation data, a number of seeds of the previous seed type will be remaining within the seed meter 68 when switching to the new seed type. As a result, a mixture of the two seed types will initially be contained within the seed meter 68 upon cutting-on or initiating the supply of new seeds to the seed meter 68. Accordingly, in one embodiment, an experimental analysis may be performed to determine an estimated transition duration across which it takes for effectively all of the seeds of the previous seed type (e.g., with a given tolerance range) to be discharged from the seed meter 68 so that the remaining seeds effectively correspond to only the new seed type. As will be described below, by knowing the planting rate for the seed meter 68, the estimated transition duration may be used by the controller 102 to determine a transition distance across which the row unit(s) 28 will travel after initiating the supply of seeds of the new seed type to the seed meter 68 prior to the seeds of the previous seed type being effectively evacuated from the meter 68.

It should be appreciated that, in addition to utilizing an estimated transition duration (or as an alternative thereto), a predetermined seed transition ratio may be used as a means for calculating the transition distance. For example, based on an experimental analysis or any other suitable data, it may be determined or estimated that the seeds of the new seed type will be discharged from the seed meter 68 at a given ratio compared to the seeds of the previous seed type. For instance, if a 2:1 seed transition ratio is used, it may be assumed that, for every two seeds of the new seed type discharged from the seed meter 68, a single seed of the previous seed type will be discharged from the meter 68. In such an embodiment, by knowing the seed buffer or margin utilized with the seed starvation data, an estimated remaining seed count may be determined for the seeds of the previous seed type. Thereafter, by knowing the planting spacing (e.g., inch/seed) for the row unit(s) 28, the transition distance across which the row unit(s) 28 will travel after initiating the supply of the new seed type to the seed meter 68 prior to the seeds of the previous seed type being effectively evacuated from the meter 68 can be determined.

Moreover, in one embodiment, the variety change database 120 may also include data associated with one or more operator-defined settings for switching between seed types. For instance, as will be described below, an operator of the planter 20 may be allowed to define a transition split percentage corresponding to the percentage of the transition distance to be defined before an encountered variety zone boundary. This may allow the operator to select how the transition distance is split across each variety zone boundary. For instance, by selecting a transition split percentage of 80% for a selected variety zone, the transition distance would be split relative to an associated variety zone boundary such that 80% of the distance is defined across the selected variety zone and 20% of the distance is defined across the variety zone located on the opposed side of the variety zone boundary. Such a split percentage may be selected, for example, if the operator desires for the majority of the transition phase to occur in the selected variety zone in order to reduce the amount of mixed varieties planted in the opposed variety zone.

Referring still to FIG. 4, in several embodiments, the instructions 116 stored within the memory 112 of the controller 102 may be executed by the processor(s) 110 to implement a variety change detection module 124. In general, the variety change detection module 124 may be configured to monitor the location of the row unit(s) 28 within the field to determine whether the row unit(s) 28 will encounter a variety zone boundary along a given planting pass being made across the field. For instance, the variety change detection module 124 may be configured to receive data associated with the location of the row unit(s) 28 within the field from a given positioning device communicatively coupled to the controller 102, such as a GPS device 126. Based on the location data, the variety change detection module 124 may then track the location of the row unit(s) 28 within the field relative to the prescription map stored within the controller's memory 112 to determine whether the row unit(s) 28 will encounter a variety zone boundary along the current planting pass being made. For instance, the various planting passes to be made by the planter 20 may be preprogrammed into the controller's memory 112 and, thus, may be accessible to the variety change detection module 124. Thus, by monitoring the current position of the row unit(s) 28 relative to the prescription map and by knowing the path that the row unit(s) 28 will take across the field as it makes its current planting pass, the variety change detection module 124 may identify whether a variety zone boundary will be encountered along each row unit's anticipated path.

In the event that it is determined that the row unit(s) 28 will encounter a given variety zone boundary of the prescription map, the variety change detection module 124 may be configured to calculate a variety change distance relative to such variety zone boundary. Specifically, in several embodiments, the variety change detection module 124 may calculate the variety change distance based on estimated starvation and transition distances across which the row unit(s) 28 will be traversed when switching between seed types along with an operator-selected transition split percentage. The details of such calculation will be described in greater detail below. Once calculated, the variety change distance may then be used by the variety change detection module 124 to define a variety change boundary relative to the variety zone boundary corresponding to the location within the field at which the controller 102 will need initiate a variety change procedure to allow the seed type currently being planted to be switched or changed.

Figure 6:
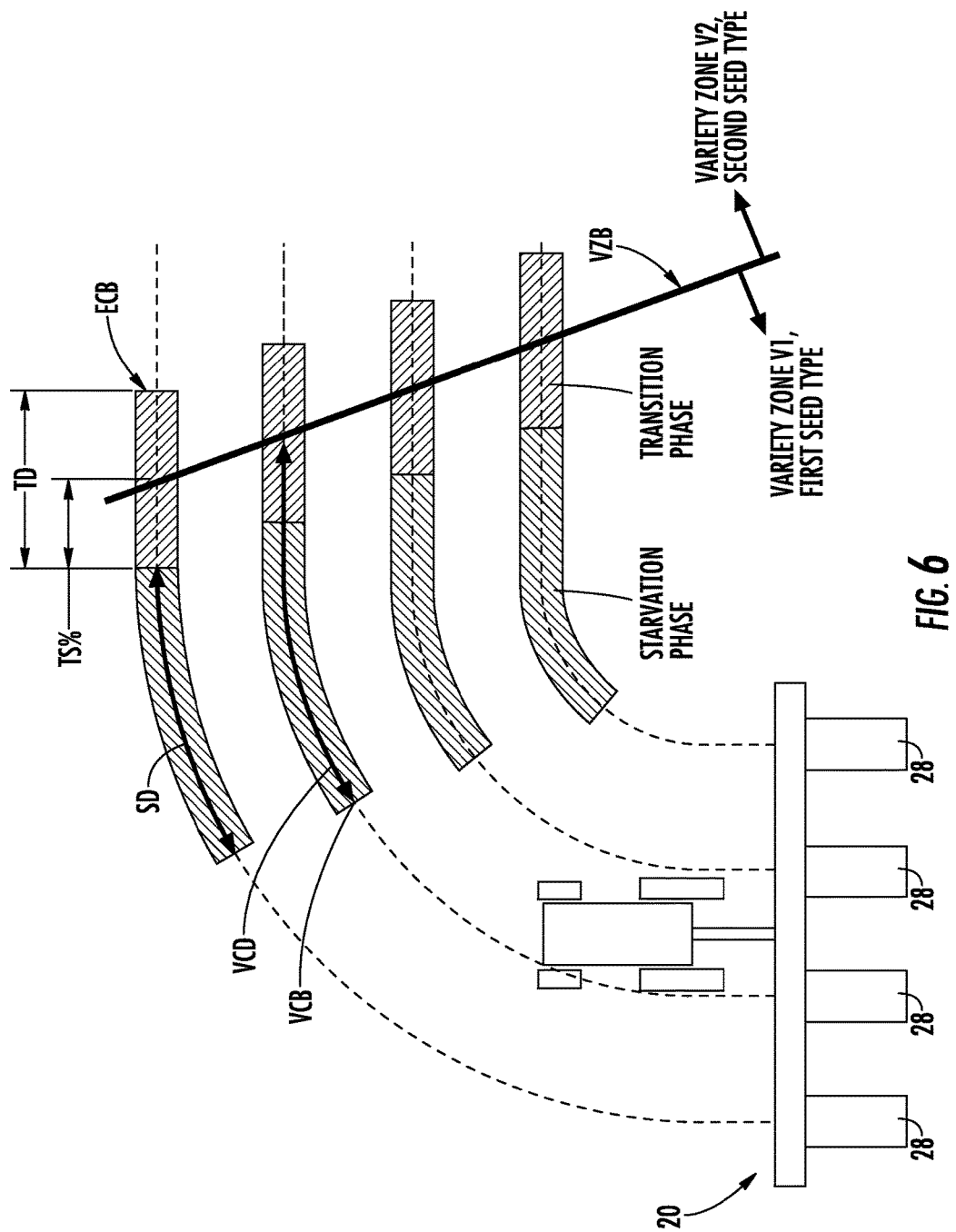
FIG. 6 illustrates a graphical view of various distances, such as a variety change distance, a starvation distance, and a transition distance, that may be calculated or determined in accordance with aspects of the present subject matter to switch between seed types during the performance of a planting operation.

A graphical example of a variety change boundary that may be defined by the variety change detection module 124 relative a given variety zone boundary is illustrated in FIG. 6. As shown, a variety zone boundary (indicated by line VZB in FIG. 6) is defined between a first variety zone VZ1 in which it is prescribed to plant seeds of a first seed type and a second variety zone VZ2 in which it is prescribed to plant seeds of a second seed type. Additionally, as shown in FIG. 6, the planter 20 is traveling along a path within the field such that the row unit(s) 28 will encounter the variety zone boundary VZB as it moves from the first variety zone VZ1 to the second variety zone VZ2, thereby requiring a change in seed type from the first seed type to the second seed type. As indicated above, to switch from the first seed type to the second seed type, the controller 102 may be configured to initiate a variety change procedure during which the supply of seed of the first seed type is cut-off from the seed meter 68 prior to turning on the supply of seeds of the second seed type to the seed meter 68.

Due to the implementation of such procedure, the variety change may include two phases, namely a starvation phase during which the seeds of the first seed type are substantially starved out or evacuated from the seed meter 68 and a transition phase during which the seed meter 68 contains a mixture of seeds of the first and second seed types prior to the seeds of the first seed type being effectively evacuated from the seed meter 68 (e.g., evacuated to within an acceptable tolerance range, as described below with reference to the effective changeover boundary). As shown in FIG. 6, the starvation phase may generally be represented by a starvation distance (SD) across which the row unit(s) 28 is traversed as the seeds of the first seed type are being substantially starved out or evacuated from the seed meter 68. Similarly, the transition phase may generally be represented by a transition distance (TD) across which the which the row unit(s) 28 is traversed while planting a mixture of the seed types prior to the seeds of the first seed type being effectively evacuated from the seed meter 68.

By calculating or knowing both the starvation distance SD and the transition distance TD, the variety change detection module 126 may be configured to calculate a variety change distance (VCD) corresponding to the distance from the variety zone boundary VZB that the row unit(s) 28 must be located prior to initiating the variety change procedure. In doing so, the variety change detection module 126 may also be configured to account for any operator-defined settings associated with defining the transition phase of the variety change procedure relative to the variety zone boundary VZB. For example, as indicated above, the operator may be allowed to select a transition split percentage (TS %) corresponding to the percentage of the transition distance TD to be defined before an encountered variety zone boundary VZB. Thus, as shown in FIG. 6, the transition split percentage TS % may specify how much of the transition distance TD is defined along either side of the variety zone boundary VZB. For instance, in the illustrated embodiment, a transition split percentage TS % of 50% has been applied such that the transition distance TD is split evenly between the first and second variety zones VZ1, VZ2. However, the transition split percentage TS % may generally correspond to any suitable percentage ranging from 0% to 100%. For example, by applying a transition split percentage TS % of 100%, the transition distance TD would be defined entirely within the first variety zone VZ1 such that the variety change procedure is completed as the row unit(s) 28 crosses the variety zone boundary VZB. Similarly, by applying a transition split percentage TS % of 20%, the transition distance TD would be split between the first and second variety zones VZ1, VZ2 such that 20% of the transition distance TD is defined with the first variety zone VZ1 and 80% of the transition distance TD is defined within the second variety zone VZ2 20%.

In one embodiment, when taking into account the transition split percentage TS %, the variety change distance VCD may be calculated according to the following equation (Equation I):

$$VCD = TS\% * TD + SD$$

wherein, VCD corresponds to the variety change distance, TS % corresponds to the transition split percentage, TD corresponds to the predetermined transition distance, and SD corresponds to the starvation distance.

As shown in FIG. 6, by calculating the variety change distance VCD, a variety change boundary (VCB) may be defined relative to the variety zone boundary VZB that identifies the location within the field at which the variety change procedure is to be initiated by the controller 102. Thus, when the row unit(s) 28 reaches the variety change boundary VCB, the variety change procedure may be initiated to allow the seed type being planted to be switched from the first seed type to the second seed type.

It should be appreciated that, in one embodiment, the variety change distance VCD may correspond to the distance across which the row unit(s) 28 is moved while such row unit(s) 28 is actively planting seeds. For instance, if the row unit(s) 28 encounters a variety change boundary VCB and initiates the variety change procedure, but then subsequently encounters a non-active area within the field (e.g., an area that has already been planted or that should not be planted), the row unit(s) 28 may stop planting seeds (and, thus, stop the variety change procedure) as the row unit(s) 28 is moved across this non-active area. In such an embodiment, the distance across the non-active area along which the row unit(s) 28 is moved may not be counted as part of the variety change distance VCD and the variety change procedure may be continued once the row unit(s) 28 has re-entered an area of the field that is intended to be planted.

It should also be appreciated that, due to the configuration and nature of operation of seed meters, it may be acceptable (or unavoidable) that a minimal amount of seeds of the first seed type may still remain within the seed meter 58 at the end of the calculated or estimated transition distance TD. Thus, as shown in FIG. 6, the end of the transition distance TD may, in several embodiments, be defined by an effective changeover boundary (ECB) that corresponds to the location at which the seeds of the first seed type have been effectively evacuated from the seed meter within an acceptable tolerance range. For example, as indicated above, an experimental analysis may be performed to determine an estimated transition time across which it takes for effectively all of the seeds of the first seed type to be discharged from the seed meter 68 so that the remaining seeds effectively correspond to only the second seed type. In such an embodiment, the estimated transition time may be determined based on when the seeds of the first seed type have been effectively evacuated from the seed meter within an acceptable tolerance range, thereby indicating an "effective changeover" between seed types. For instance, in several embodiments, it may be determined that the seeds of the first seed type have been effectively evacuated from the seed meter 68 when at least 70% of the seeds discharged from the seed meter 68 over a minimum number of consecutively discharged seeds (e.g., 40 seeds) correspond to seeds of the second seed type, such as when at least 80% of the seeds discharged from the seed meter 68 over a minimum number of consecutively discharged seeds correspond to seeds of the second seed type, or when at least 90% of the seeds discharged from the seed meter 68 over a minimum number of consecutively discharged seeds correspond to seeds of the second seed type. By determining the estimated transition time based on the "effective changeover" between seed types, the controller 102 may determine the transition distance TD across which the row unit(s) 28 will travel after initiating the supply of seeds of the second seed type to the seed meter 68 prior to the seeds of the first seed type being effectively evacuated from the meter 68.

Referring back to FIG. 4, the instructions 116 stored within the memory 112 of the controller 102 may also be executed by the processor(s) 110 to implement a variety change execution module 128. In general, the variety change execution module 128 may be configured to execute the variety change procedure for switching between seed types during a planting operation. As indicated above, the variety change boundary VCB identified by the variety change detection module 124 may serve as the trigger for initiating the variety change procedure. Specifically, in several embodiments, the variety change execution module 128 may be configured to monitor the location of the row unit(s) 28 relative to the variety change boundary VCB. Once the row unit(s) 28 reaches the variety change boundary VCB, the variety change execution module 128 may be configured to initiate the starvation phase of the variety change procedure by cutting-off or terminating the supply of seeds of the current seed type to the meter 68. For instance, the variety change execution module 128 may control the operation of each seed supply device 104 such that the supply of seeds of the current seed type is cut-off to the meter 68. Thereafter, once the row unit(s) 28 has traveled a distance from the variety change boundary VCB corresponding to the starvation distance SD (thereby allowing the seed meter 68 to be substantially evacuated of seeds of the current seed type), the variety change execution module 128 may be configured to turn on or initiate the supply of seeds of the new seed type to the seed meter 68 (e.g., via control of the seed supply device(s) 104) to begin the final, transition phase of the variety change procedure. The variety change procedure is completed once the remaining seeds of the first seed type are effectively evacuated from the seed meter 68. Thereafter, the seeds of the new seed type may continue to be supplied to the seed meter 68 to allow such seeds to be planted across the new variety zone being traversed by the row unit(s) 28.

Additionally, as shown in FIG. 4, the instructions 116 stored within the memory 112 of the controller 102 may also be executed by the processor(s) 110 to implement a calibration module 130. Specifically, in several embodiments, the calibration module 139 may be configured to execute a calibration routine for calibrating one or more parameters impacting the implementation of the variety change procedure. For example, as will be described below in greater detail, it may be desirable, in certain instances, to execute an on-the-fly calibration routine during the planting operation to calibrate or update the starvation data being used to calculate the associated starvation distance SD. In such instances, to execute the calibration routine, the calibration module 130 may be configured to cut-off the supply of seeds currently being delivered to the seed meter 68 and monitor the operation of the seed meter 68 until one or more starvation indicators are detected that indicate that the seed meter 58 is about to be starved of seeds. For instance, the calibration module 130 may be configured to detect a given number of skips during operation of the seed meter 68, thereby providing an indication that the seed meter 68 is nearly starved of seeds. Once the starvation indicator(s) is detected, the calibration module 130 may be configured to reinitiate the supply of seeds to the seed meter 68 to prevent actual starvation of the seed meter 68. The data collected during the calibration routine may then be recorded within the controller's memory 112 and subsequently used to calibrate the pre-existing starvation data. For instance, the calibration module 130 may record the elapsed time or the amount of seeds discharged between when the supply of seeds was cut-off and when the starvation indicator(s) was detected. Such data may then be used, for example, to update or calibrate the starvation seed count data stored within the variety change database 122.

It should be appreciated that, to detect the starvation indicator(s), the controller 102 may be communicatively coupled to one or more seed sensors 132 configured to monitor one or more seed-related parameters. For example, in one embodiment, the seed sensor(s) 132 may correspond to a seed tube sensor(s) mounted within the associated seed tube 72 of each row unit 28 to allow seed skips and/or the number of seeds discharged from the seed meter 68 to be detected. In another embodiment, the seed sensor(s) 132 may correspond to a sensor(s) configured to detect seeds contained within the seed meter 68 (or a lack thereof), such as an internal seed pool sensor configured to detect seeds within a seed chamber of the seed meter 68 or a seed sensor configured to detect seeds being conveyed by a seed disk of the seed meter 68.

Moreover, as shown in FIG. 4, the controller 102 may also include a communications interface 134 to provide a means for the controller 102 to communicate with any of the various other system components described herein. For instance, one or more communicative links or interfaces 136 (e.g., one or more data buses) may be provided between the communications interface 134 and the seed supply device(s) 102 to allow the controller 102 to transmit control signals for controlling the operation of the seed supply device(s) 104. Similarly, one or more communicative links or interfaces 138 (e.g., one or more data buses) may be provided between the communications interface 134 and the GPS device 126 to allow the location data from the GPS device 1126 to be transmitted to the controller 102. Moreover, one or more communicative links or interfaces 140 (e.g., one or more data buses) may be provided between the communications interface 134 and the seed sensor(s) 132 to allow the sensor data to be transmitted to the controller 102.

It should be appreciated that, in one embodiment, the controller 102 of the disclosed system 100 may correspond to a vehicle controller of the work vehicle configured to tow the planter 20 or the controller 102 may correspond to an implement controller of the planter 20. Alternatively, the controller 102 may form part of a distributed computer network that includes or is in communication with the vehicle controller and/or the implement controller.

Figure 7:
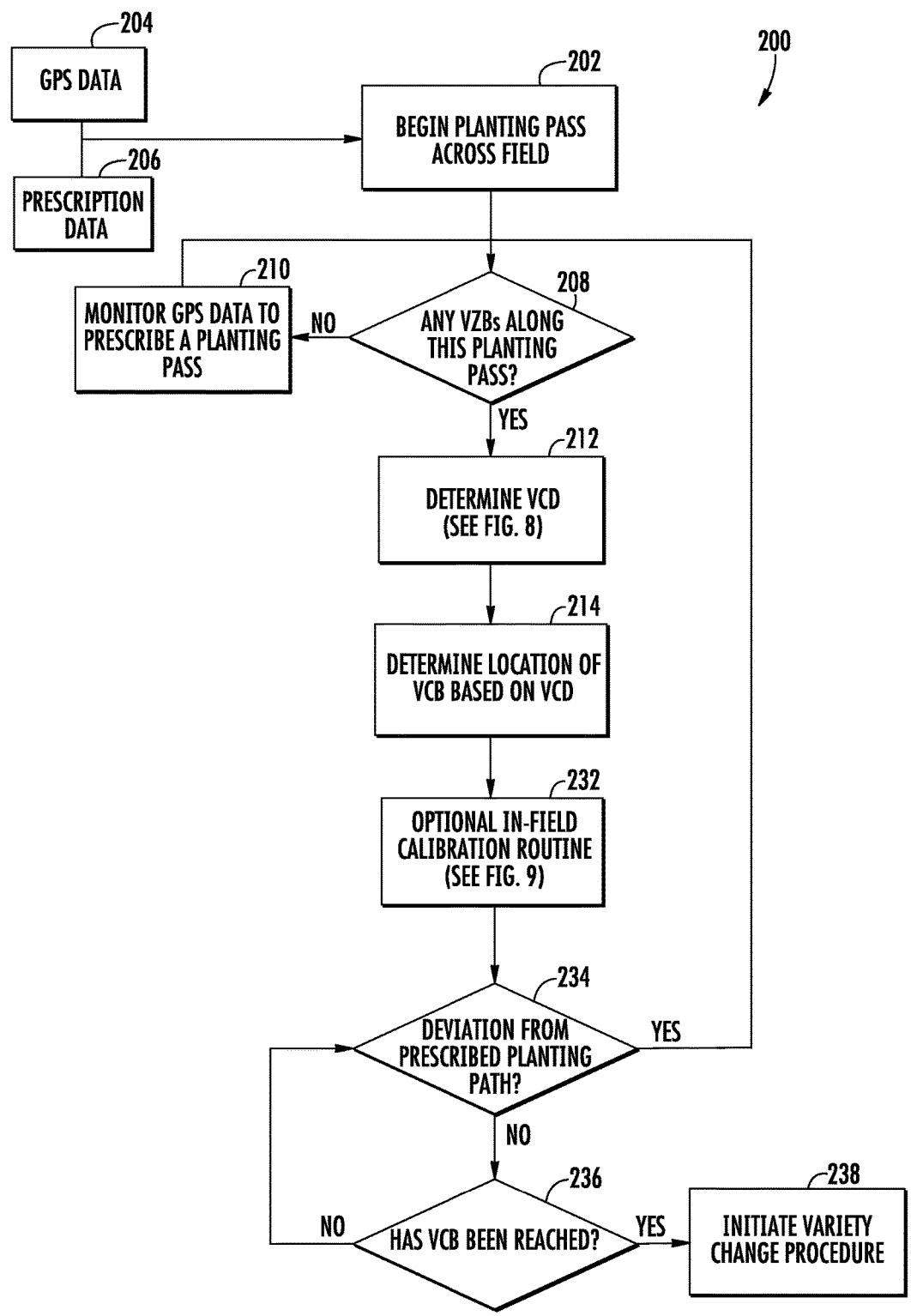
FIG. 7 illustrates a flow diagram of one embodiment of a control algorithm that may be executed when switching seed types during a planting operation in accordance with aspects of the present subject matter.
Figure 8:
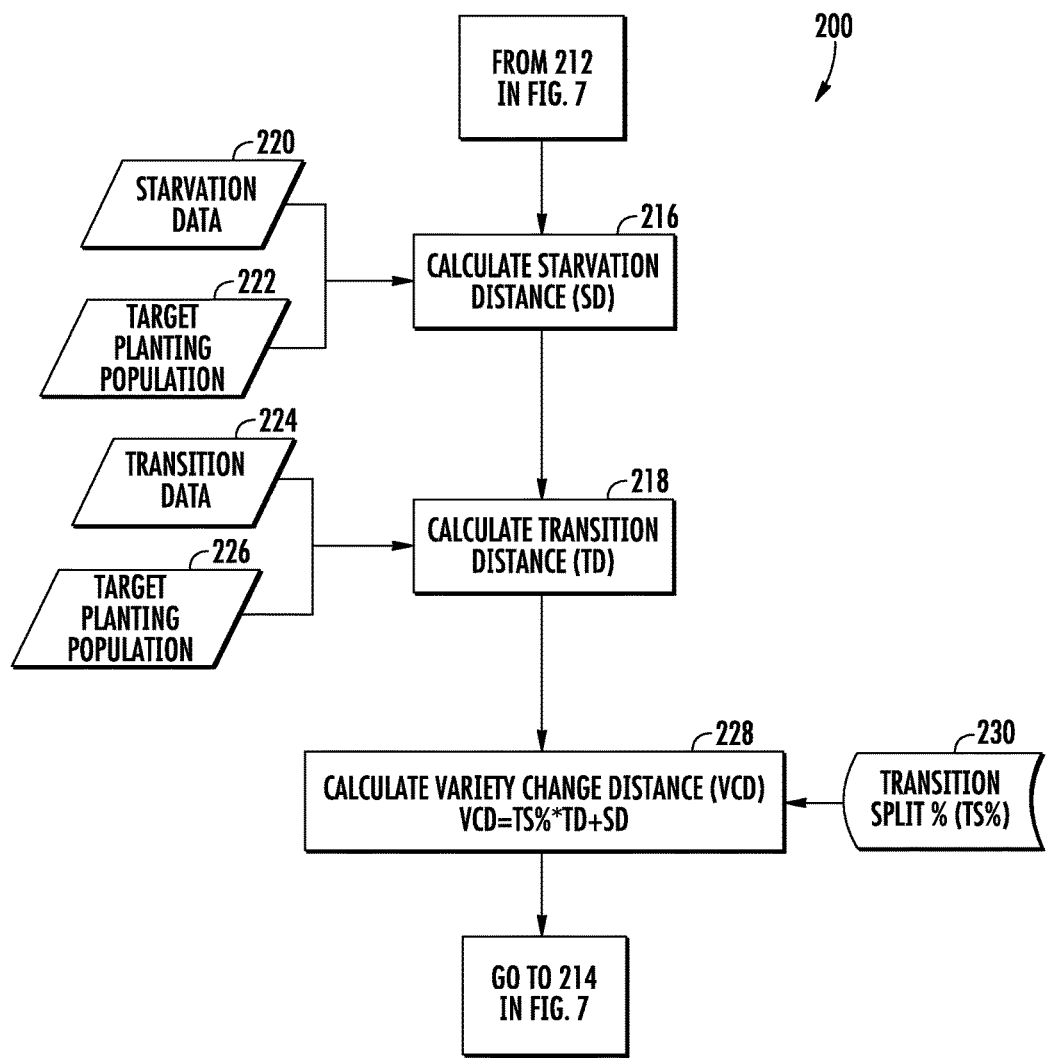
FIG. 8 illustrates a flow diagram of one embodiment of a sub-algorithm that may be executed when performing the control algorithm shown in FIG. 7 in accordance with aspects of the present subject matter.
Figure 9:
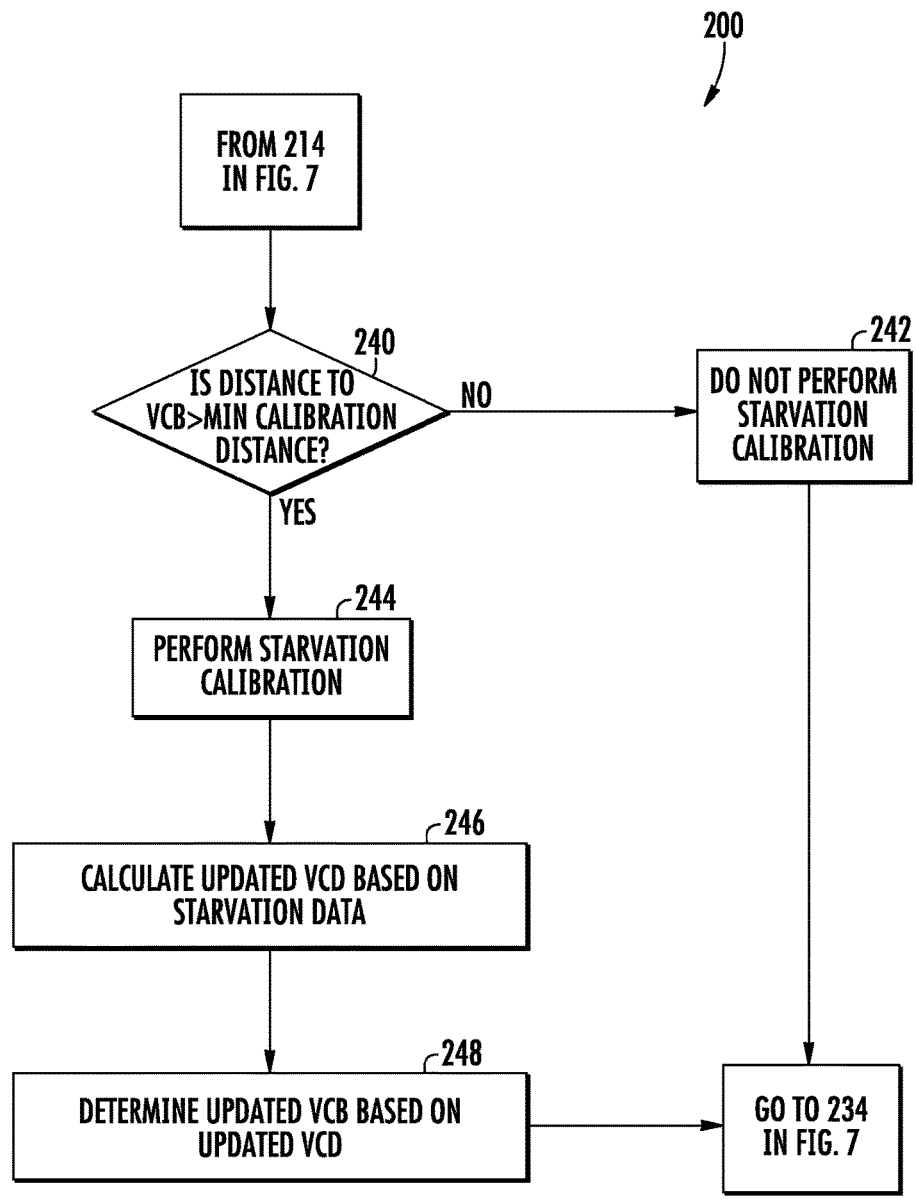
FIG. 9 illustrates a flow diagram of one embodiment of another sub-algorithm that may be executed when performing the control algorithm shown in FIG. 7 in accordance with aspects of the present subject matter.

Referring now to FIGS. 7-9, a flow diagram of one embodiment of a control algorithm 200 that may be utilized when switching between seed types during the performance of a planting operation is illustrated in accordance with aspects of the present subject matter. In general, the control algorithm 200 will be described herein as being implemented by the controller 102 of the system 100 described above with reference to FIG. 4. However, it should be appreciated that the various processes described below may alternatively be implemented by a separate computing device or by a combination of computing devices. In addition, although FIGS. 7-9 depict control steps or functions performed in a particular order for purposes of illustration and discussion, the control algorithms discussed herein are not limited to any particular order or arrangement. One skilled in the art, using the disclosures provided herein, will appreciate that various steps or functions of the algorithms disclosed herein can be omitted, rearranged, combined, and/or adapted in various ways without deviating from the scope of the present disclosure.

As shown in FIG. 7, the control algorithm 200 is initiated when the planter 20 begins a planting pass across the field (e.g., at 202). As is generally understood, each planting pass may correspond to a predetermined path based on guidance lines set for the planter 20. Additionally, as shown in FIG. 7, as the planter 20 makes its pass across the field, the controller 102 may be configured to receive input data and/or access data stored within its memory 112 for implementing the control algorithm 200. For example, at 204, GPS data may be received from the GPS device 126 for monitoring the position of the planter 20 and the row units 28 within the field. Additionally, the controller 102 may access prescription data stored within its prescription database 118, such as a planting prescription map for the field. For instance, as indicated above, the controller 102 may be configured to continuously monitor the location of the planter 20 and the row units 28 (e.g., via the GPS data 204) relative to the prescription map to determine which seed type should be planted and to identify the location of variety zone boundaries that may be encountered along the current planting pass.

As shown in FIG. 7, at 208, the controller 102 determines whether the row unit(s) 28 will encounter any variety zone boundaries (VZBs) as planter 20 makes the current planting pass based on the planting prescription map. If it is determined that the row unit(s) 28 will not encounter any variety zone boundaries VZBs along the current planting pass, the controller 112, at 210, will continue to monitor the GPS data for changes in the prescribed path of the planter 20, thereby allowing the controller 102 to determined when the planter 20 has turned to make a different planting pass across the field along a new guidance line. However, if it is determined that the row unit(s) 28 will encounter a variety zone boundary VZB along the current planting pass, the controller, at 212, will calculate a variety change distance (VCD) from the variety zone boundary VZB, thereby allowing the controller 102 to identify the location of the variety change boundary VCB (e.g., at 214) at which the variety change procedure will need to be initiated as the row unit(s) 28 moves toward the variety zone boundary VZB.

Referring briefly to FIG. 8, a flow diagram of one embodiment of sub-algorithm for calculating the variety change distance (VCD) is illustrated. To calculate the variety change distance (VCD), the controller 102 may be configured to initially calculate or determine both a starvation distance SD and a transition distance TD (e.g., at 216 and 218). As shown in FIG. 8, in one embodiment, the starvation distance SD may be calculated based at least in part on one or more sets of input data, such as the starvation data (e.g., at 220) stored within the controller's memory 112 and the target planting population for the row unit(s) 28 (e.g., at 222). As indicated above, the starvation data may include, for example, a starvation seed count corresponding to an estimated number of seeds that should be remaining within the seed meter 68 upon cutting-off the supply a given seed type to the meter 68 less a given seed margin or buffer (e.g., less 10% of the estimated number of seeds). In such an embodiment, using the starvation seed count (e.g., a given number of seeds) and the target planting population (e.g., in seeds/inch), the controller 102 may, at 216, be configured to calculate the starvation distance SD across which the row unit(s) 28 will be moved following the supply of the current seed type being cut-off from the meter 68 before the seeds of the current seed type have been substantially evacuated from the seed meter 68. It should be appreciated that, as described herein, the seed meter 68 may, for example, be substantially evacuated of seeds when the remaining amount of seeds is generally equal to or less than the amount of seeds associated with the seed buffer or margin applied to determine the starvation seed count.

Additionally, as shown in FIG. 8, in one embodiment, the transition distance TD may be calculated based at least in part on one or more sets of input data, such as the transition data (e.g., at 224) stored within the controller's memory 112 and/or the target planting population for the row unit(s) 28 (e.g., at 226). As indicated above, the transition data may include, for example, an estimated number of metered seeds for effectively evacuating the previous seed type from the seed meter 68 once the supply of the new seed type has been initiated. In such an embodiment, by knowing the estimated transition time period and the current speed of the row unit(s) 28, the controller may, at 218, be configured to calculate the transition distance TD across which the row unit(s) 28 will be moved upon initiating the supply of the new seed type. In addition to such estimated transition time period (or as an alternative thereto), the transition data may include, for example, a predetermined seed transition ratio defining the ratio at which the seeds of the new seed type will be discharged from the seed meter 68 in relation to the seeds of the previous seed type. In such an embodiment, by knowing the predetermined seed transition ratio and the target planting population, the controller may, at 218, be configured to calculate the transition distance TD across which the row unit(s) 28 will be moved upon initiating the supply of the new seed type.

As shown in FIG. 8, upon calculating the starvation distance SD and the transition distance TD, the controller 102 may, at 228, calculate the variety change distance VCD as a function of such distances as well as the transition split percentage (TS %) defined for the planting operation. For example, as indicated above, the controller 102 may, in one embodiment, receive the transition split percentage TS % as an operator-defined input (e.g., at 230). Alternatively, the transition split percentage TS % may be defined or selected via any other means, such as by being defined as part of the planting prescription for the field. Regardless, utilizing the starvation distance SD, the transition distance TD, and the transition split percentage TS %, the controller 102 may calculate the variety change distance VCD using, for example, Equation 1 provided above.

Referring back to FIG. 7, upon determining the variety change distance VCD at 212, the controller 102 may, at 214, identify the location of the variety change boundary VCB relative to the variety zone boundary VZB. As indicated above with reference to FIG. 6, the variety change boundary VCB may be defined by spacing the variety change boundary VCB apart from the variety zone boundary VZB along the row unit's current planting pass in the direction opposite the travel direction by the variety change distance VCD. As such, the variety change boundary VCB may identify the location within the field at which the variety change procedure is to be initiated by the controller 102.

As shown in FIG. 7, after determining the location of the variety change boundary VCB, the controller 102 may, in certain instances, execute an optional calibration routine (e.g., at 232), which will be described below with reference to FIG. 9. Regardless of whether the calibration routine is performed, the controller 102 may then, at 234, determine whether any deviations from the prescribed path of the planter 20 have been made. If so, the control algorithm 200 will loop back to 208. However, if no deviations from the prescribed path of the planter 20 have been made (thereby indicating that at least one row unit 28 is still traveling along the current planting pass and will intersect the variety zone boundary VZB), the controller 102 may, at 236, determine whether the row unit(s) 28 has reached the previously determined location of the variety change boundary VCB. If not, the control algorithm 200 will loop back to 234. However, once the controller 102 determines that the row unit(s) 28 has reached the variety change boundary VCB, the controller 102 may, at 238, initiate the variety change procedure for switching seed types along the current planting pass for the planter 20.

The variety change procedure may generally be executed as described above. For example, upon reaching the variety change boundary VCB, the controller 102 may cut-off or terminate the supply of the current seed type to the seed meter 68 (e.g., via control of the associated seed supply device 104) to allow the seeds of the current seed type to be substantially evacuated from the seed meter 68 during the starvation phase of the procedure. Once the row unit(s) 28 has traveled the calculated starvation distance SD, the controller 102 may then cut-on or initiate the supply of the new seed type to the seed meter 68. The row unit(s) 28 may then travel the calculated transition distance TD during the transition phase of the variety change procedure as the remainder of the seeds of the previous seed type are effectively discharged from the seed meter.

Referring now to FIG. 9, as indicated above, the controller 102 may, in certain instances, be configured to execute an in-field calibration routine as the planter 20 is making its current planting pass across the field. As shown in FIG. 9, at 240, the controller 102 may determine whether the distance defined between the current location of the row unit(s) 28 and the determined location of the variety change boundary VCB is greater than a minimum calibration distance required to perform the calibration routine. Such minimum calibration distance may be calculated or determined by the controller 102 based on, for example, the estimated number of seeds in the meter (e.g., as determined experimentally from previously performed calibrations) and the target planting population. If the distance defined between the current location of the row unit(s) 28 and the location of the variety change boundary VCB is not greater than the minimum calibration distance, the controller 102 may, at 242, determine that the calibration routine should not performed. The control algorithm 200 may then return to 234 in FIG. 7. However, if the distance defined between the current location of the row unit(s) 28 and the location of the variety change boundary VCB is greater than the minimum calibration distance, the controller 102 may, at 244, perform a starvation calibration routine to allow the starvation data stored within the controller's memory 112 to be updated or calibrated.

For example, to execute the calibration routine, the controller 102 may be configured to cut-off the supply of seeds currently being delivered to the seed meter 68 and monitor the operation of the seed meter 68 until one or more starvation indicators are detected that indicate that the seed meter 68 is about to be starved of seeds. Once the starvation indicator(s) is detected, the controller 102 may be configured to reinitiate the supply of seeds to the seed meter 68 to prevent actual starvation of the seed meter 68 as the planter 20 continues to make the current planting pass. The data collected during the calibration routine may then be recorded within the controller's memory 112 and subsequently used to calibrate or update the pre-existing starvation data. For instance, the controller 102 may record the elapsed time or the amount of seeds discharged between when the supply of seeds was cut-off and when the starvation indicator(s) was detected. Such data may then be used, for example, to update or calibrate the starvation seed count data stored within the variety change database 122.

As shown in FIG. 9, after performing the calibration routine, the controller 102 may, at 246, calculate an updated variety change distance VCD based on the updated or calibrated starvation data. For instance, assuming a change in the determined starvation seed count, the starvation distance SD will need to be recalculated. The variety change distance VCD may then be calculated by inputting the newly calculated starvation distance into Equation 1. Thereafter, at 248, the controller 102 may be configured to calculate an updated variety change boundary VCB based on the updated variety change distance VCD. The control algorithm 200 may then continue at 234 in FIG. 7 with the updated variety change boundary VCB being used by the controller 102 at 236 in FIG. 7.

Figure 10:
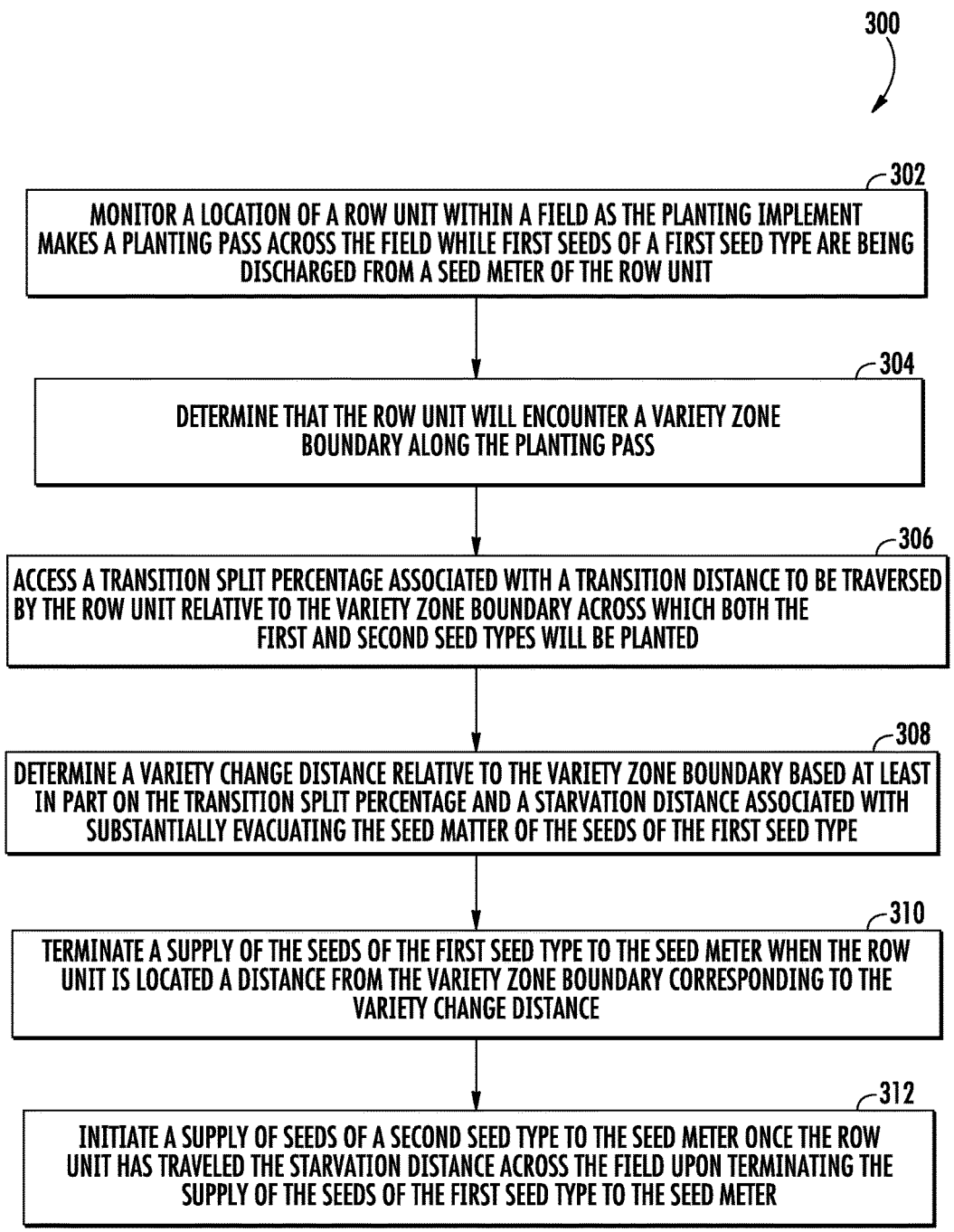
FIG. 10 illustrates a flow diagram of one embodiment of a method for switching seed types between a first seed type and a second seed type when performing a planting operation with a row unit of a planting implement in accordance with aspects of the present subject matter.

Referring now to FIG. 10, a flow diagram of one embodiment of a method 300 for switching between seed types during the performance of a seed planting operation is illustrated in accordance with aspects of the present subject matter. In general, the method 300 will be described herein with reference to the system 100 described above with reference to FIG. 4 and the control algorithm 200 described above with reference to FIGS. 7-9. However, it should be appreciated by those of ordinary skill in the art that the disclosed method 300 may be implemented within any other system and/or using any other suitable control algorithm. In addition, although FIG. 10 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 10, at 302, the method 300 may include monitoring a location of a row unit of a planting implement within a field as the planting implement makes a planting pass across the field while first seeds of a first seed type are being discharged from a seed meter of the row unit. For example, as indicated above, the controller 102 may be configured to receive GPS data from an associated GPS device 126 for monitoring the location of the planter 20 and the row units 28 within the field. As a result, the controller 102 may monitor the location of the planter 20 and the row units 28 relative to a prescription map defined for the field as the planter 20 makes each planting pass.

Additionally, at 304, the method 300 may include determining that the row unit will encounter a variety zone boundary along the planting pass. For example, by accessing the prescription map stored within its memory 112, the controller 102 may determine whether the row unit(s) 28 will encounter a variety zone boundary VZB along its current planting pass.

Moreover, at 306, the method 300 may include accessing a transition split percentage associated with a transition distance to be traversed by the row unit relative to the variety zone boundary across which both the first and second seed types will be planted. For example, as indicated above, the transition split percentage TS % may correspond to an operator-defined input. Alternatively, the transition split percentage TS % may correspond to predetermined value forming part of the planting prescription for the field.

Referring still to FIG. 10, at 308, the method 300 may include determining a variety change distance relative to the variety zone boundary based at least in part on the transition split percentage and a starvation distance associated with substantially evacuating the seed meter of the seeds of the first seed type. Specifically, as indicated above, the variety change distance VCD may correspond to the summation of the starvation distance SD and the portion of the transition distance TD defined forward of the variety zone boundary VZB (e.g., as specified by the transition split percentage TS %). For instance, in one embodiment, the variety change distance VCD may be calculated using Equation 1 provided above.

Additionally, at 310, the method 300 may include terminating a supply of the seeds of the first seed type to the seed meter when the row unit is located a distance from the variety zone boundary corresponding to the variety change distance. For instance, as indicated above, when the variety change boundary VCB is reached by the row unit(s) 28, the controller 102 may be configured to control the operation of each seed supply device 104 to cut-off or terminate the supply of seeds of the current seed type to the seed meter 68, thereby initiating the starvation phase of the variety change procedure.

Moreover, at 312, the method 300 may include initiating a supply of seeds of a second seed type to the seed meter once the row unit has traveled the starvation distance across the field upon terminating the supply of the seeds of the first seed type to the seed meter. Specifically, as indicated above, after cutting-off the supply of seeds of the current seed type, the controller 102 may be configured to continue to monitor the location of the row unit(s) 28 as the planter 20 travels towards the variety zone boundary VZB. Once the row unit(s) 28 has traveled the starvation distance SD, the controller 102 may initiate the supply of seeds of the new seed type to the seed meter 68 to shift the variety change procedure to its seed transition phase.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for switching seed types between a first seed type and a second seed type during a planting operation, the method comprising:

monitoring, with a computing device, a location of a row unit of a planting implement within a field as the planting implement makes a planting pass across the field while seeds of the first seed type are being discharged from a seed meter of the row unit;

determining, with the computing device, that the row unit will encounter a variety zone boundary along the planting pass, the variety zone boundary identifying a location within the field at which it is prescribed to switch from planting seeds of the first seed type to planting seeds of the second seed type;

accessing, with the computing device, a transition split percentage associated with a transition distance to be traversed by the row unit relative to the variety zone boundary across which seeds of both the first and second seed types will be planted;

determining, with the computing device, a variety change distance based at least in part on the transition split percentage and a starvation distance associated with substantially evacuating the seed meter of the seeds of the first seed type;

when the row unit is located a distance from the variety zone boundary corresponding to the variety change distance, terminating, with the computing device, a supply of seeds of the first seed type to the seed meter; and once the row unit has traveled the starvation distance across the field upon terminating the supply of the seeds of the first seed type to the seed meter, initiating, with the computing device, a supply of seeds of the second seed type to the seed meter.

2. The method of claim 1, further comprising determining, with the computing device, the transition distance to be traversed by the row unit.

3. The method of claim 2, wherein the transition split percentage corresponds to a percentage of the transition distance across which the row unit is to be traversed prior to reaching the variety zone boundary.

4. The method of claim 2, wherein determining the variety change distance comprises determining the variety change distance based at least in part on the transition split percentage, the starvation distance, and the transition distance.

5. The method of claim 4, wherein the variety change distance is determined according to the following relationship:

$$VCD=TS\%*TD+SD$$

wherein, VCD corresponds to the variety change distance, TS % corresponds to the transition split percentage, TD corresponds to the transition distance, and SD corresponds to the starvation distance.

6. The method of claim 1, further comprising accessing, with the computing device, a prescription map associated with the field to determine that the row unit will encounter the variety zone boundary along the planting pass.

7. The method of claim 1, wherein a variety change boundary is located the variety change distance from the variety zone boundary along the planting pass, further comprising determining, with the computing device, whether a distance defined between a current location of the row unit within the field and the variety change boundary is greater than a minimum calibration distance for performing an in-field calibration routine.

8. The method of claim 7, further comprising:
when the distance is greater than the minimum calibration distance, performing, with the computing device, the in-field calibration routine to determine an updated starvation distance for substantially evacuating the seed meter of the seeds of the first seed type; and
determining, with the computing device, an updated variety change distance based at least in part on the transition split percentage and the updated starvation distance.

9. The method of claim 1, wherein terminating the supply of seeds of the first seed type to the seed meter comprises actively controlling an operation of a seed supply device provided in operative association with the seed meter to cut-off the supply of seeds of the first seed type to the seed meter.

10. The method of claim 9, wherein initiating the supply of seeds of the second seed type to the seed meter comprises actively controlling the operation of the seed supply device to initiate the supply of seeds of the second seed type to the seed meter.

11. A system for switching seed types between a first seed type and a second seed type when performing a planting operation with a row unit of a planting implement, the system comprising:
a seed meter;
a seed supply device configured to regulate a supply of seeds of the first seed type and the second seed type to the seed meter; and
a controller communicatively coupled to the seed supply device, the controller including a processor and associated memory, the memory storing instructions that, when implemented by the processor, configure the controller to:
monitor a location of the row unit within a field as the planting implement makes a planting pass across the field while seeds of the first seed type are being discharged from the seed meter;
determine that the row unit will encounter a variety zone boundary along the planting pass, the variety zone boundary identifying a location within the field at which it is prescribed to switch from planting seeds of the first seed type to planting seeds of the second seed type;
access a transition split percentage associated with a transition distance to be traversed by the row unit relative to the variety zone boundary across which seeds of both the first and second seed types will be planted;
determine a variety change distance based at least in part on the transition split percentage and a starvation distance associated with substantially evacuating the seed meter of seeds of the first seed type;
when the row unit is located a distance from the variety zone boundary corresponding to the variety change distance, control the operation of the seed supply device to terminate the supply of seeds of the first seed type to the seed meter; and
once the row unit has traveled the starvation distance across the field upon terminating the supply of the seeds of the first seed type to the seed meter, control the operation of the seed supply device to initiate the supply of seeds of the second seed type to the seed meter.

12. The system of claim 11, wherein the controller is further configured to determine the transition distance to be traversed by the row unit.

13. The system of claim 12, wherein the transition split percentage corresponds to a percentage of the transition distance across which the row unit is to be traversed prior to reaching the variety zone boundary and along which it is prescribed to plant seeds of the first seed type.

14. The system of claim 12, wherein the controller is configured to determine the variety change distance based at least in part on the transition split percentage, the starvation distance, and the transition distance.

15. The system of claim 14, wherein the variety change distance is determined according to the following relationship:

$$VCD=TS\%*TD+SD$$

wherein, VCD corresponds to the variety change distance, TS % corresponds to the transition split percentage, TD corresponds to the transition distance, and SD corresponds to the starvation distance.

16. The system of claim 11, wherein the controller is further configured to access a prescription map associated with the field to determine that the row unit will encounter the variety zone boundary along the planting pass.

17. The system of claim 11, wherein a variety change boundary is located the variety change distance from the variety zone boundary along the planting pass, the controller being further configured to determine whether a distance defined between a current location of the row unit within the field and the variety change boundary is greater than a minimum calibration distance for performing an in-field calibration routine.

18. The system of claim 17, wherein, when the distance is greater than the minimum calibration distance, the controller is configured to perform the in-field calibration routine to determine an updated starvation distance for substantially evacuating the seed meter of the seeds of the first seed type, the controller being further configured to determine an updated variety change distance based at least in part on the transition split percentage and the updated starvation distance.

* * * * *